March 5, 1935.  L. L. LINDSEY ET AL  1,993,105
FARM MACHINERY
Filed July 25, 1934    2 Sheets-Sheet 2
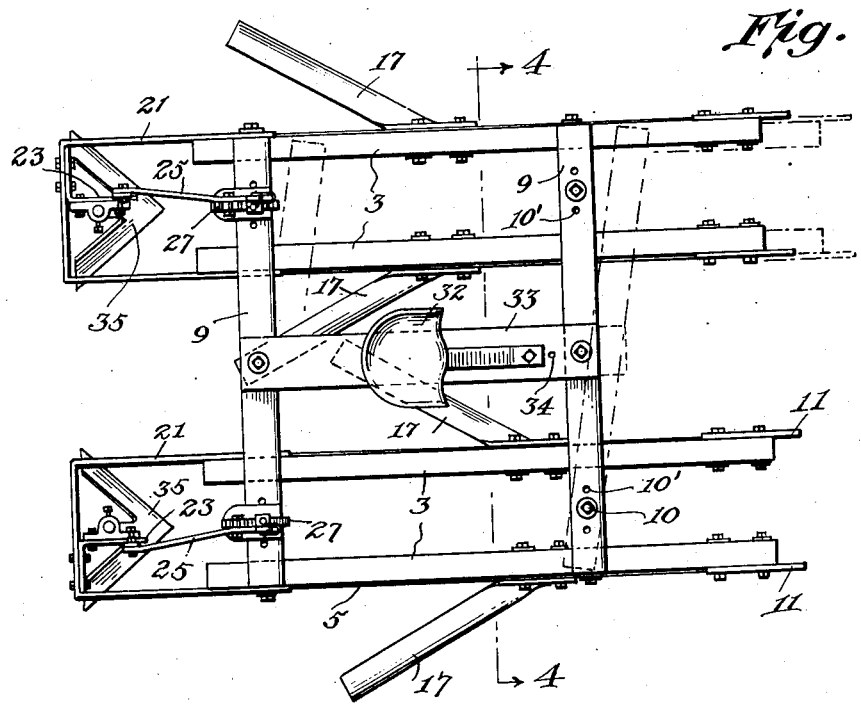
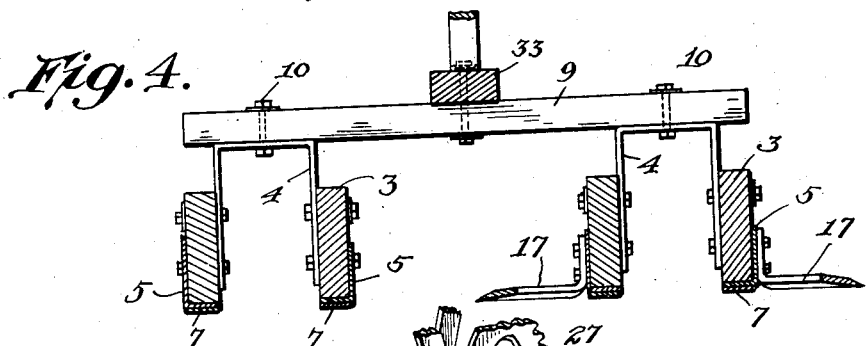
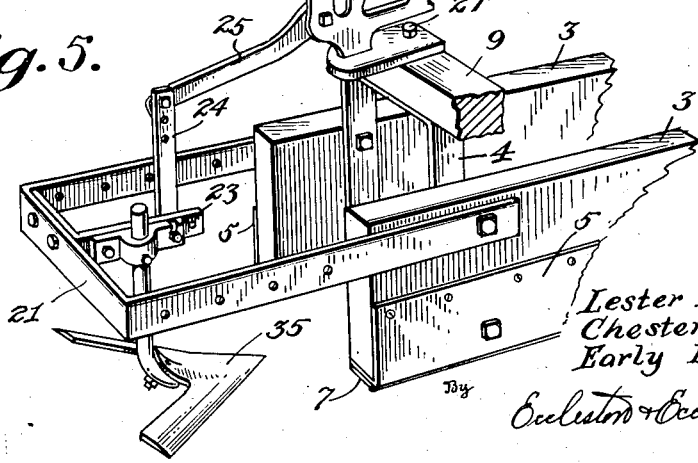
Inventors
Lester L. Lindsey
Chester L. Lindsey
Early R. Lindsey
By Eccleston & Eccleston, Attorneys Patented Mar. 5, 1935

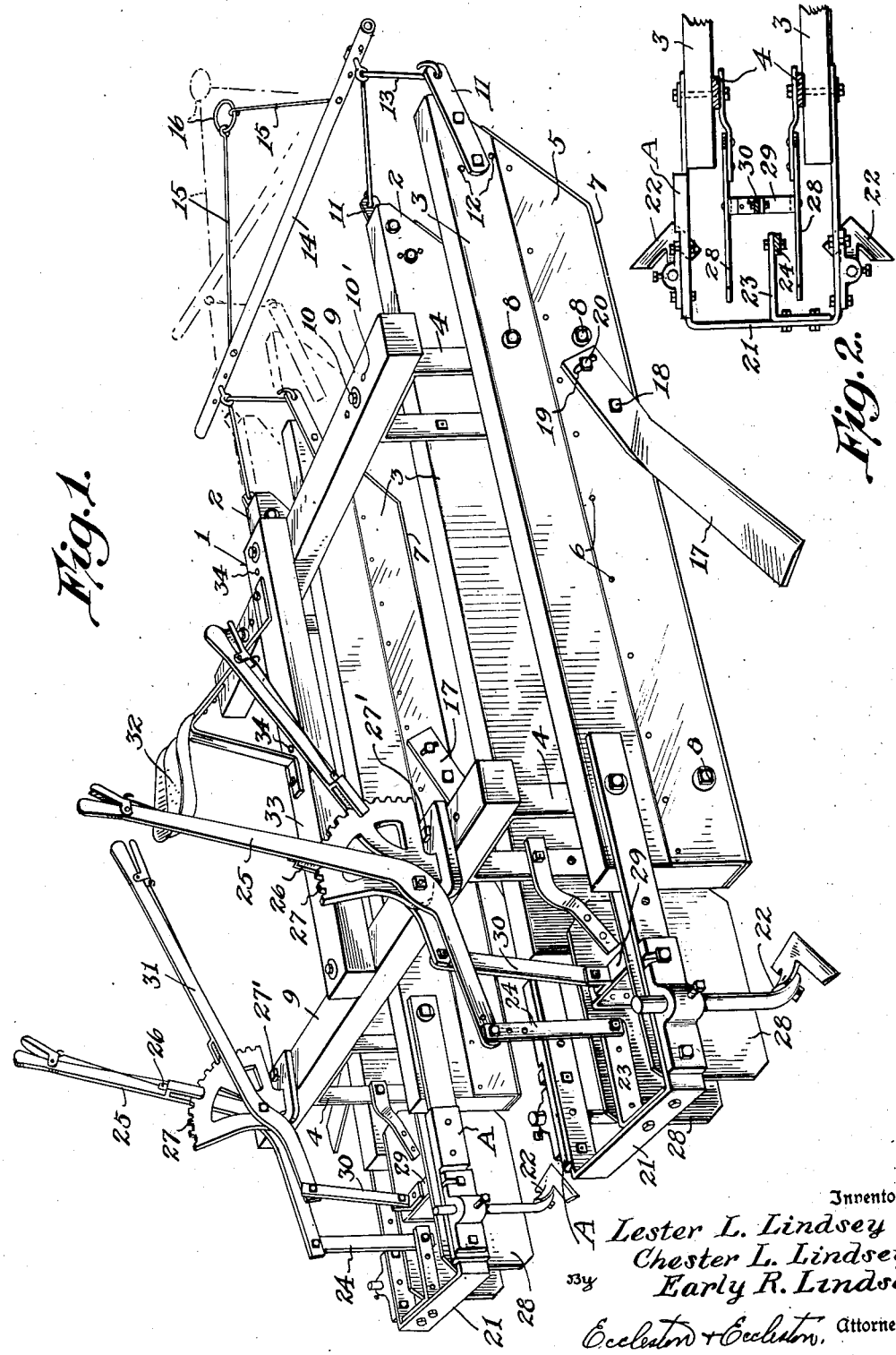

1,993,105

UNITED STATES PATENT OFFICE 1,993,105

FARM MACHINERY

Lester L. Lindsey, Chester L. Lindsey, and Early R. Lindsey, Anson, Tex.

Application July 25, 1934, Serial No. 736,936

6 Claims. (Cl. 97—140)

This invention relates to farm machinery and has for its primary object to provide apparatus for simultaneously plowing and blading seed beds, and which with slight alteration may be used for cultivating the beds after planting, or for blading the beds either before or after planting.

Another object of the invention resides in the provision of a device for working two rows at once and in which means are provided to conform the same to slight variations in the distance between the two rows.

A further object of the invention consists in the provision of a double slide cultivator or plow in which relative movement is permitted between the two slides while maintaining them in their original parallel relationship.

Another object of the invention resides in providing a two-row cultivator in combination with independently adjustable shields or fenders for accurately controlling the amount of earth flowing to the plant row.

Other objects and advantages of the invention will be apparent from the following description when taken in connection with the accompanying drawings, in which, Figure 1 is a perspective view of the complete two-row cultivator.

Figure 2 is a fragmentary horizontal sectional view of one of the sections, taken on a line above the slide runners.

Figure 3 is a plan view of the device arranged as a two-row plow and blader, and showing in dotted outline a relative movement between the parts.

Figure 4 is a vertical sectional view taken on line 4—4 of Figure 3, and

Figure 5 is a fragmentary perspective view of one of the plow sections.

Referring to the drawings in more detail and especially to Figures 1 and 2, the numeral 1 indicates generally the two-row cultivator, and the numeral 2 indicates each of the cultivator sections.

The cultivators are of the slide type and each comprises a pair of slide runners 3 rigidly secured together by vertically disposed front and rear braces or yokes 4 to form sleds. The runners 3 are preferably protected from undue wear by means of metal sheathing 5 which is secured to the runners by tacks 6 or other preferred means. The bottoms or lower edges of the runners are protected by heavy steel bands 7.

The yokes 4 which serve to rigidly connect the runners of each sled are fixed to the runners by bolts 8, and the corresponding yokes of the two sleds are connected by tie beams 9. These beams are connected to the yokes 4 by means of pivot bolts 10 and thus permit a relative movement between the sleds. The bolt apertures 10' in the beams 9 provide for suitably spacing the sleds for rows of different widths. This arrangement of relative movement between the sleds is advantageous in that it renders the apparatus more flexible in turning corners; also if one sled should encounter an obstruction the parallel movement provided by the pivotal connection will allow the particular sled to drop behind and move to one side of the obstruction. It should also be noted that this parallel rule arrangement of the sleds permits a lateral adjustment so as to conform the sleds to variations in distance between the rows, and also that it eliminates side draft where one sled is encountering more resistance than the other as when one plow is running deeper than the other.

Eye brackets 11 extend forwardly from each runner 3 and the forward ends of these brackets may be adjusted vertically by reason of the bolt holes 12 formed in the runners. V-rods 13 have their ends mounted in the brackets 11 and are connected together by cross bar 14 on which the steel rods 15 are mounted to support a ring connection 16 for the hitch clevis.

Mounted on the outer side of the outside runners 3 and on the inside of the inside runners are bladers 17 which are adapted to travel slightly below the surface of the bed and cut down any weeds encountered. The blades 17 are pivoted to the runners 3 as indicated at 18 and by reason of the arcuate slots 19 and bolts 20 it will be apparent that the vertical positions of the blades may be varied as desired.

Pivoted on the rear end of each sled 2 is a U-shaped yoke 21 on which is adjustably mounted a pair of cultivator plows 22. Each yoke is provided with an arm 23 to which is pivotally connected a link 24 which is in turn pivoted to a bell-crank lever 25. The levers 25 are adapted to be hand operated and are provided with locking detents 26 which cooperate with toothed quadrants 27. The quadrants are connected to the rear brackets 4 by single bolts 27' which extend through openings in the beam 9. It will be apparent therefore that the plows 22 are adjustable as to depth and may also be moved to operative and inoperative positions as desired. Blocks A serve to vary the space between the plows. In order to regulate or control the amount of earth which may be caused to flow around the plants by the cultivator plows 22 guards or shields are provided. These shields consist of pairs of plates 28 pivoted on the inner walls of the sleds at the rear thereof and the plates of each pair are rigidly connected by a bracket 29. Links 30 are pivotally connected to the brackets 29 and the upper ends of the links are pivoted to hand levers 31 provided with locking detents for cooperation with the toothed quadrants 27. It will be obvious therefore that by properly adjusting the levers 31 the positions of the pairs of shields 28 may be varied independently so as to control the flow of earth to the plants of each row.

A seat 32 is provided for the operator of the cultivator and is adjustably mounted on a longitudinal beam 33 as by means of bolt holes 34. The beam 33 has its ends pivotally connected to the cross beams 9 and thus permits freedom of these beams when relative movement occurs between the sleds 2.

The foregoing description of the cultivator will, it is believed, render its operation entirely clear to those skilled in the art. It may be emphasized however that the parallel movement provided between the sleds produces a two-row cultivator which readily adapts itself to variations in distance between the rows and also minimizes the liability of breakage of parts if an obstruction is encountered in the field. Moreover, this arrangement of the sleds also facilitates turning at the end of the field and also prevents side draft when one cultivator is working deeper than the other.

In Figures 3, 4 and 5 the identical apparatus of Figures 1 and 2 is shown except that certain parts have been removed and others substituted. As previously mentioned the present apparatus is designed to blade the seed beds either before or after planting, to blade the beds and clean and mulch the middle, and to blade the beds and cultivate small plants by the use of small plows and shields. To this end the small plows and the shields are removably mounted on the sleds so that the apparatus may be used for blading only or be combined with larger plows for cleaning and mulching the rows and blading the sides.

Figures 3 and 5 show the small plows 22 removed from the sides of the sleds, as well as the guards 28, and larger plows 35 attached. These plows are adjustably secured to the arms 23 of yokes 21 and hence are properly positioned on the longitudinal center lines of the sleds. Operation of the bell-crank levers 25 will serve to independently raise and lower the plows as desired. With this combination of elements it will be seen that the beds can be plowed and bladed prior to planting and that the same advantageous results will be derived from the slide-rule connection of the sleds. When it is desired to cultivate the young plants and blade the bed the small plows and guards are attached in lieu of the plows 35, or the apparatus may be used solely for blading, in which case the large and small plows as well as the guards 28 are omitted.

From the above description and the attached drawings it will be apparent to those skilled in the art that we have devised an exceedingly simple construction of farming implement of the sled type; that it may be used as a two-row plow and blader, or readily converted into a cultivator for various purposes; and that the parallel movement permitted between the sleds facilitates turning of the apparatus at the ends of the field as well as minimizes the liability of breakage, prevents side draft, etc., as heretofore mentioned.

In accordance with the patent statutes we have described what we now believe to be the preferred form of the invention but inasmuch as various minor changes may be made without departing from the spirit of the invention it is intended that all such changes be included within the scope of the appended claims.

What we claim is:

1. A farming implement including a pair of sleds arranged in parallel relation, a cross-beam adjacent the rear ends of said sleds and having its respective ends pivoted thereto, plows pivotally connected to the rear ends of the sleds, and means mounted on the cross-beam for raising or lowering the plows.

2. A farming implement including a pair of sleds arranged in parallel relation, a cross-beam adjacent the rear ends of said sleds and having its respective ends pivoted thereto, farming tools pivotally connected to the rear ends of said sleds, hand levers pivotally mounted on the cross-beam adjacent each end thereof, and links connecting said levers and tools.

3. A farming implement including a pair of sleds arranged in parallel relation, a bracket fixed to each sled adjacent its rear end, a cross-beam having its respective ends pivoted to the brackets, farming tools mounted for vertical movement at the rear ends of the sleds, vertically disposed quadrants pivotally connected to the beam, a lever associated with each quadrant, and links connecting said levers and tools.

4. A farming implement including a sled, a U-shaped bracket extending rearwardly from the sled and having its ends connected thereto, an arm rigidly connected to the base of the bracket, and means for securing farming tools to the legs of said bracket and to said arm.

5. A farming implement including a pair of sleds arranged in parallel relation, a cross-beam adjacent the rear ends of the sleds and having its respective ends pivoted thereto, cultivator plows pivoted on the rear ends of the sleds, shield plates also pivoted to the rear ends of the sleds, levers mounted on said beam for vertical and horizontal movement with respect thereto, and connections between said levers, plows and plates.

6. A farming implement including a sled, a U-shaped bracket extending rearwardly from the sled and having its ends connected thereto, an arm rigidly connected to the base of the bracket, farming tools secured to the legs of said bracket, and means pivotally connected to said arm for raising and lowering the bracket.

LESTER L. LINDSEY.
CHESTER L. LINDSEY.
EARLY R. LINDSEY.